United States Patent [19]

George-Kelso et al.

[11] Patent Number: 5,208,767

[45] Date of Patent: May 4, 1993

[54] DISPLACEMENT MEASURING APPARATUS

[75] Inventors: Simon George-Kelso; Vinay Sajip; Jim Lindop; Paul T. Ryan, all of Cambridge, United Kingdom

[73] Assignee: The Stanley Works, New Britain, Conn.

[21] Appl. No.: 92,911

[22] PCT Filed: Nov. 26, 1986

[86] PCT No.: PCT/US86/02557

§ 371 Date: Jan. 9, 1991

§ 102(e) Date: Jan. 9, 1991

[87] PCT Pub. No.: WO87/03361

PCT Pub. Date: Jun. 4, 1987

[30] Foreign Application Priority Data

Nov. 28, 1985 [GB] United Kingdom ................. 8529360

[51] Int. Cl.5 .......................... G01B 3/10; G06F 15/20
[52] U.S. Cl. ...................................... 364/563; 33/706; 33/707; 33/763; 377/18
[58] Field of Search .................. 33/763, 707, 706, 763; 364/560, 562; 377/18, 24, 45, 53

[56] References Cited

U.S. PATENT DOCUMENTS

| 4,009,377 | 2/1977 | Elms | 364/561 |
| 4,161,781 | 7/1979 | Hildebrandt et al. | 377/18 X |
| 4,195,348 | 3/1980 | Kakutani | 33/763 X |
| 4,631,519 | 12/1986 | Johnston | 341/15 X |
| 4,799,798 | 1/1989 | Erb | 33/707 X |

OTHER PUBLICATIONS

F. Jessie MacWilliams et al, Proceedings of the IEEE, vol. 64, No. 12, Dec. 1976, pp. 1715-1729.

Primary Examiner—Edward R. Cosimano
Attorney, Agent, or Firm—Chilton, Alix & Van Kirk

[57] ABSTRACT

A tape rule or other displacement measuring apparatus comprises a reader means and a member that are relatively movable. The member carries a position track defined by a sequence of alternative markings made in succession along the member. The alternative markings record different values in a pseudo-random sequence which is the result of repetitive operations on a seed consisting of a small number of elements. The sequence has the property that a group of successive markings of length at least equal to that of the seed occurs at a single position in the sequence so that a succession of markings read from the track and of length at least equal to the seed defines an absolute position of the reading means and the member. The reading means has at least three sensors arranged to respond to different locations within each marking with the pattern of the markings and the location of the sensors arranged so that only a single sensor changes state each time that the member moves through an interval of displacement relatively to the sensing means. The states occur consecutively in alternative sequences along the member that are recognizable by decoding logic fed with successive states as a logical value corresponding to one of the alternative markings depending upon which sequence has been followed.

9 Claims, 7 Drawing Sheets

DISPLACEMENT MEASURING APPARATUS

FIELD OF THE INVENTION

This invention relates to displacement measuring apparatus and particularly, though not exclusively, to a tape rule.

BACKGROUND TO THE INVENTION

It is known, e.g., from Patent Specification Nos. U.S. Pat. No. 4,162,781; GB-A-2056660 and GB-A-1571245 to read optical markings on a tape rule and derive therefrom information about the position of the tape. If only movement and direction are required to be known, then only two photosensors are required. A workable tape system can be made using this approach and an implementation of it is described in U.S. Pat. No. 4,161,781. In essence, such an arrangement counts output state transitions as the tape moves from a known position to an unknown position whose displacement is to be measured. But positional accuracy relies on accurate and reliable knowledge of the first position and on accurate transition counting. Should any error occur in counting during a movement, as a result of damage to the line of marks being counted, then subsequently the known position will be in error, and the tape as a whole will be useless.

A method and apparatus for determining the absolute position of a movable element mounted for movement along a path is described in U.S. Pat. No. 4,009,377 (Elms) and is based on the development of a pseudo-randum sequence of indicia that uniquely define the position of the movable element on the path. But the provision of a separate timing track is essential and errors in reading the timing track would result in spurious detected indicia and large errors in measured position from which recovery would be difficult. The use of binary sequences to address sections of a rotating device is described by B. Arazi, Electronics Letters, 20, 61–62 (19 Jan. 1984).

SUMMARY OF THE INVENTION

It is an object of the invention to provide a tape rule or other displacement measuring device in which an accurate measurement of current tape position can be deduced irrespective of whether or not the first position of the tape was known, and that is robust to erasure or failure to measure accurately some of the tape markings between the initial and the current tape positions. It is a further object of the invention to provide a displacement measuring device having a multiplicity of sensors responsive to different areas of a spatial code track of the tape, wherein an absolute tape position can be deduced from the code by analysis of a sequence of sensor output states brought about by tape movement.

Broadly stated the invention provides displacement measuring apparatus comprising a member having marks and spaces occurring along a position track and defining encoded opsitions, sensing means past which the member moves arranged to read marks and spaces from the position track, and decoding logic fed with the output of the sensing means and arranged to derive a tape position from sensed and decoded information from the position track. The use in a tape rule of a position track carrying encoded information that is not simply counted is believed to be new.

The invention therefore provides displacement measuring apparatus comprising reading means and a member that are relatively movable, wherein the member carries a position track defined by a sequence of alternative markings made in succession along the tape, wherein;

(a) the alternative markings record different values in a pseudo-random sequence which is the result of repetitive operations on a seed consisting of a small number of elements, the sequence having the property that a group of successive markings of length at least equal to that of the seed occurs at a single position in the sequence so that a succession of markings read from the track and of length at least equal to the seed defines an absolute position of the reading means and the member; and (b) the reading means has at least three sensors arranged to respond to different locations within each marking with the pattern of the markings and the location of the sensors arranged so that only a single sensor changes state each time that the member moves through an interval of displacement relatively to the sensing means, the states occurring consecutively in alternative sequences along the member that are recognizable by decoding logic fed with successive states as a logical value corresponding to one of the alternative markings depending upon which sequence has been followed.

The term "alternative" as used herein does not exclude the possibility that the markings may be of three or more kinds, although two possible markings are preferred because the sequences that are most conveniently used are binary. The use of a number of sequence laid down end to end along the member is also not excluded, but is not preferred. Thus in a three meter tape there could be three such sequences each one meter long following one another.

The invention employs a member having marks and spaces defining at least one encoded position track and sensing means arranged to detect different locations of said at least one position track and to provide output signals at least one of whose states changes each time the member has travelled past the sensing means through an internal of displacement, wherein the local states from the sensing means at successive steps occur in sequences consecutively along the member and that for each sequence are recognized by decoding logid fed with successive local states as one or other logical value of an absolute position code (APC) for the member depending upon which sequence has been followed.

The data stream extracted from the local state sequence is used to provide absolute position data, for this purpose a suitable coding system is needed. A set a cyclic codes known as maximum length binary sequences yields an appropriate code. These codes are long serial bit patterns that are derived from all the possible combinations of a short, fixed length, section. They can be produced by certain autonomous feedback shift registers from a binary seed of n-bits and have the properties that(a) within any sequence any n-bit combination is unique and (b) the sequence is finite and is only $(2^n - 1)$ bits long. This has a particular benefit for the present purpose since if part of the overall cyclic sequence, of length equal to the fixed length of the binary seed, is examined, the position within the overall cyclic code can be easily and uniquely deduced. Furthermore, this remains true no matter where the section starts. Such pseudo-random sequences and their properties and their generation useing feedback shift registers are discussed by F. Jessie MacWilliam et al. roc. IEEE,64, 1715–1729, 12 Dec. 1976.

DESCRIPTION OF PREFERRED FEATURES

Given that every possible bit combination occurs somewhere in the cyclic APC sequence code, then using the above approach yields no error protection. Errors that cause single or multiple bits to be corrupted can cause very large positional errors since the positions on the tape for these sequences are unlikely to be close to the uncorrupted sequence. There is an effective error detection and/or correction technique that can be applied. Supposing the short section length for the given cyclic code is n-bits then, as already stated, for every combination of n-bits there will be a matching part of the cyclic code where n is the number of bits in the seed. However, supposing an (n+1) bit section is examined, not every combination of (n+1) bit sequences occurs in the cyclic code. I.e. for a given n bit sequence, the (n+1) is defined. For most single bit errors, the resulting n+1 bit sequence does not match any of the sequences in the cyclic code, thus giving a high degree of error direction.

The sequential state coding proposed herein has inherent error detection capabilities. Firstly, only a limited number of the possible local states are allowed (any other seen is detected as an error) and secondly, for each state there is usually only one, two or three allowable transitions. The absolute position coding can also have error protection built in, as has been described, so the whole system can detect reading errors very reliably. The question then arises as to what should be done if an error is seen. The requirement for the user is that unless an irrecoverable situation is reached the tape should read accurately and normally. Supposing a local state sequence error is seen, then this is most likely to be the result of damage to the tape pattern. An appropriate course of action is to continue to observe local state transitions until the next absolute position code bit is coded. If alternatively, an error in the absolute position code is found and it is not within the error correction capability of the code, then the APC bit must be discarded together with the accumulated APC bits and a new seed of APC bits must be read from the tape so that the new tape position can be determined. Conveniently it is arranged that the decoding logic can substitute an expected APC bit for a first APC bit in error, but that a second APC bit in error with the length n of the seed will trigger a reset.

BRIEF DESCRIPTION OF THE DRAWINGS

An embodiment of the invention will now be described, by way of example only, with reference to the accompanying drawings, in which:

FIG 2. shows a short length of the tape rule;

FIG. 3 shows an analogue signal processing stage of the data processing system;

DETAILED DESCRIPTION OF THE INVENTION

Figure 1:
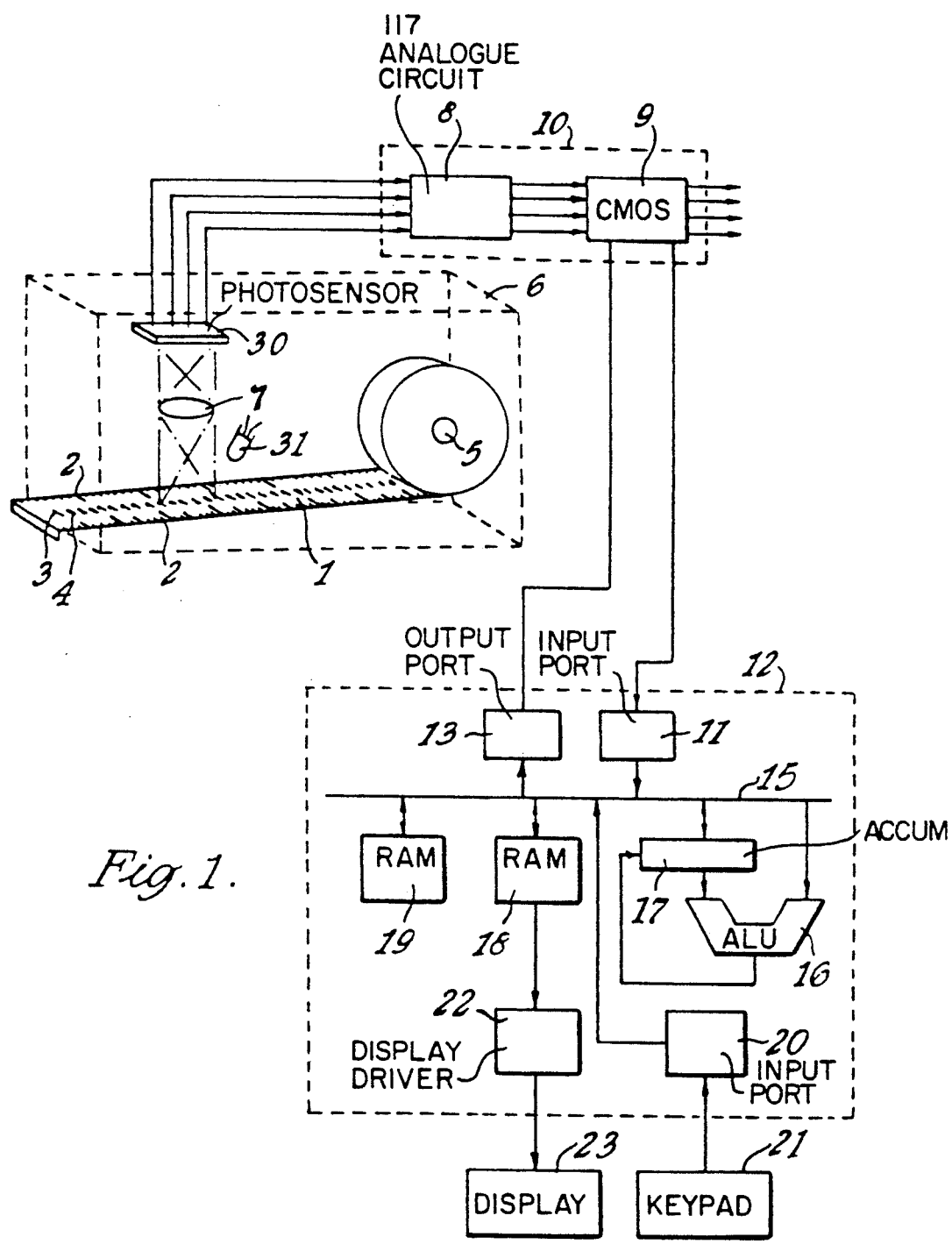
FIG. 1 is a diagram of a tape ruling having optical data capture from encoder tracks and an associated data processing system providing a digital position output.

In the drawings, there is shown a steel tape rule that incorporates an electronic system that can give a digital reading of length, measured in either metric or imperial units. In use the tape operates in a similar manner to a conventional steel rule but can include additional features to assist the user, for example, automatic correction of reading for reveal measurement, taking the tape body width into account.

The proposed measurement method is described below in conjunction with FIG. 1. A tape 1 of steel or other inextensible material is used as in a conventional tape rule controlled by a tensator spring 5 but is printed with a pair of spatial encoded tracks 3, 4 in addition to the usual visually readable distance scales 2. Internal to a casing 6 of the product, the tape 1 is illuminated by means of a light-emitting diode 31 and image of the encoder tracks 3, 4 is formed using a lens 7 on a photosensor array 30 which is arranged to have four sensitive areas in grouped pairs corresponding to the paired encoder tracks 3, 4. Each sensitive area views a small part of its encoder track. The pairs of sensors in array 30 are aligned with the tracks 3, 4 which are defined by mark and space or black and white areas of varying widths, printed on the tape 1, and image at the photosensors. Movement of the tape 1 cause the light level at each photosensor 30a (FIG. 3) to vary as the area of The tape 1 corresponding to an individual photosensitive area 30a change between black and white. By suitable analogue processing, four binary signals, one for each photosensitive area 30a, are derived from the photosensor outputs. The two states of the signals represent black or white at the areas on the tape 1 corresponding to each of the photosensors. Movement of the tape 1 causes the binary signals to change as the encoder tracks 3, 4 move past the photosensitive areas 30a.

The pattern of the encoder tracks 3, 4 and the spacing of the photosensors 30a are arranged so that for every position on the tape 1, incremental movements of the tape 1 cause only one of the outputs to change state at a time. Sequences of states fulfilling this criterion are known as Gray codes. Additionally, it can be arranged that the direction of movement can, at all times, be deduced from the change in output states.

As is apparent from FIG. 1, the output of sensor array 30 is fed to an analogue processing circuit 8 and then to CMOS digital processing logic 9 which are implemented in a single application-specified integrated circuit (ASIC) 10 that provides data at input port 11 of a 4-bit CMOS mask-programmed microprocessor 12 and receives information and commands through an output port 13. The digital processing logic 9 of the ASIC 10 includes a local state decoder and an APC binary sequence decoder that are both implemented as logic and hence can run much more rapidly than the microprocessor 12 so that the code tracks 3, 4 can be followed even during rapid tape movement. The architecture of the microprocessor 12 is similar to a conventional calculator-type microprocessor and the ports 11, 13 communicate via a 4-bit bus 15 with an ALU 16, accumulator 17, display RAM 18 and general purpose RAM 19 which may be of 2-2K size. A keypad 21 communicates with the bus 15 through input port 20 that may read up to 12 keys. The output value to be displayed is fed from display RAM 18 to a display driver 22 that may conveniently drive a display of up to 64 segments and is shown on a liquid crystal display 23.

ANALOGUE SIGNAL PROCESSING

Figures 2, 3:
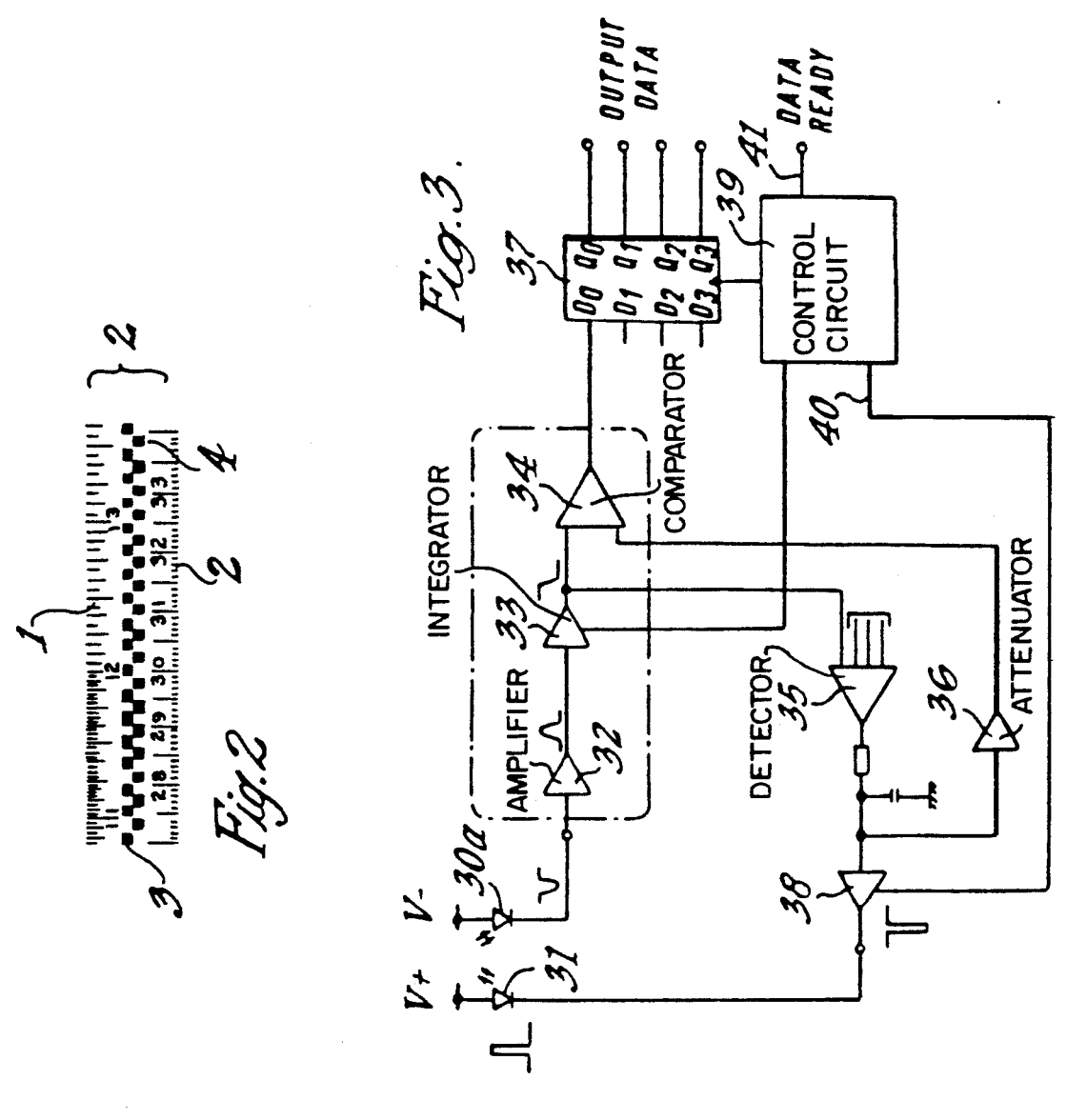

The two encoder tracks 3, 4 as explained above, are read by four photosensors 30 that are illuminated either by a single light-emitting diode 31 or by a pair of photodiodes 31 that illuminate a region of the tracks. In FIG. 3, only a single photosensor 30 is shown, but the remaining three channels closely resemble the channel illustrated. Each photosensor signal is passed through a respective signal conditioner comprising an amplifier 32, integrator 33 and comparator 34. The output of integrator 33 is further fed to a 4-channel peak detector 35 and the output of the channel having the highest signal level is fed through attenuator 36 to a second input to comparator 34. The arrangement is such that channels in which the signal level is close to the peak level within the limit set by attenuator 36 will record logic 1 at 4-bit latch 37 and channels with a lesser signal level will show a logic 0. The peak output of detector 35 is fed to a voltage controlled current source 38 that controls the brightness of light-emitting diode 31. A timing and control circuit 39 including an oscillator and latched gates provides enabling pulses at line 40 to the current source 38 to strobe the light-emitting diode 31 and further provides a data ready pulse at output line 41 to instruct subsequent logic that the output of latch 37 may be read. The use of pulses rather than a continuous output for light-emitting diode 31 reduces power consumption, and the pulsing frequency selected will be sufficiently rapid (e.g. 40 KHz) to allow the code tracks to be read under normal conditions of use, as the tape is extended from and retracted into the housing. The peck detector 35 and attenuator 36 provides dynamic thresholding of the signal level at the input to comparator 34 so that a binary output representing mark or space (black or white) areas of the tape is continuously available.

LOCAL STATE DECODING

Figure 4:
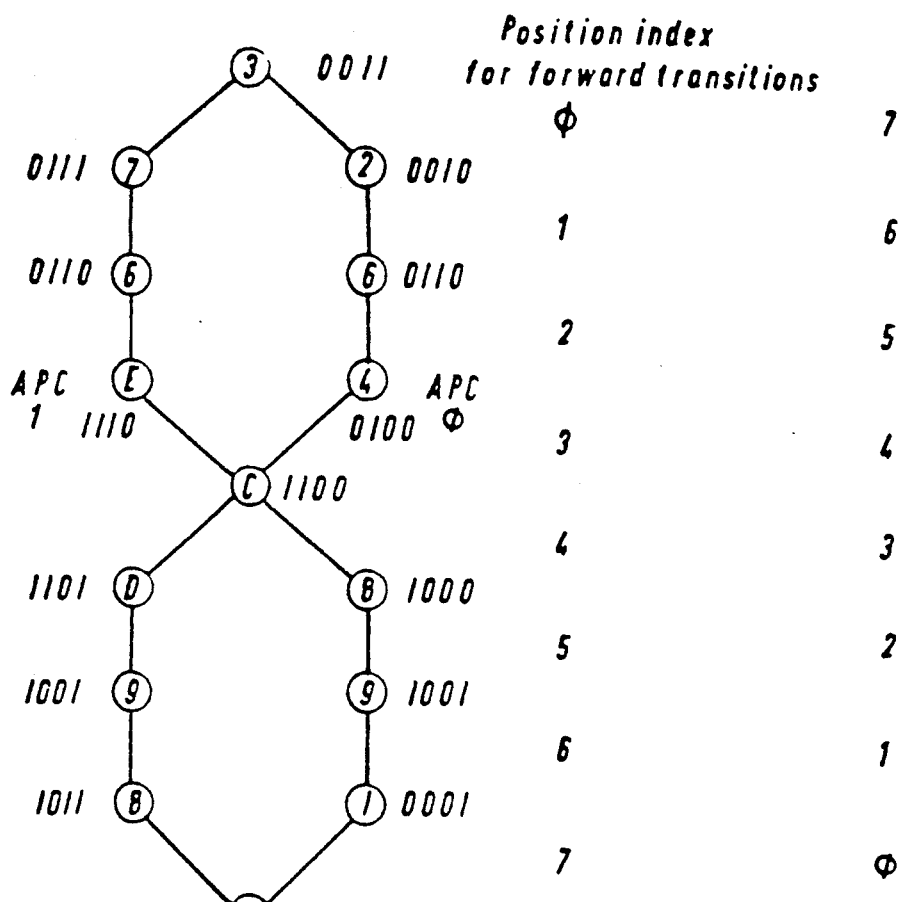
FIG. 4 is a diagram showing a sequence of allowed local output states of the signal processing stage and transitions between them within a single sequence or block of tape absolute code (APC)

FIG. 4 shows a sequence of local states occurring in blocks each defining one bit of the absolute position code (APC) laid down along the tape and shows two alternative sequences by which the photosensors 30a can change in state from 0011 to 1100 and back again to 0011, the sequence reverting to its initial value of 0011 at the 8th transition irrespective of which path is taken. It is to be understood that the pattern of mark and space markings defining the tracks 3, 4 will be laid down end to end along the tape so as to implement the left hand or the right hand sequence of FIG. 4 with the initial 0011 state being common to adjoining blocks. State changes are arranged to occur when the tape 1 and photosensors 30 are moved relative to one another through an interval of displacement and the pattern of marks and spaces is computer-generated and laid down along the tape 1 to implement the required sequence of local states as viewed by the sensor array 30, changes between 0 and 1 of the four bit pattern commanding changes from dark to light of the markings viewed by the respective sensors and the lengths of the individual dark and light markings. It will be noted that the successive transitions in each path conform to a Gray code in that each differs from its neighbours by one bit only, and that each of the states has a unique value, so that two successive states sensed by the photosensor 30 give both the direction of tape movement and position in the block. Thus successive output states of 0100 and 1100 uniquely define position 3 in a forward movement along the right hand path defining an APC bit $\phi$ whereas a transition from 0110 to 0111 uniquely defines position 6 in a reverse tape movement along the left hand path defining an APC 1 bit. FIG. 2 shows a section of tape bearing markings coded according to the above scheme. In FIG. 2 there is shown a pattern of markings on the tape 1 that will obey the sequence of FIG. 4 when read by an appropriately spaced and ordered sensor array. Each APC bit gives rise to one mark in each track 3, 4, and the marks occur in diagonally related pairs each roughly corresponding to one APC bit. The correspondence is not exact, however, because neighbouring APC states are conjoined and the dark markings are sometimes wholly within the span of a single APC bit and sometimes extend across a boundary between adjoining APC bits so that the marking is common to adjacent bits. Each marking in a track 3 or 4 may be long (5 intervals of pitch), medium (4 intervals of pitch) or short (3 intervals of pitch) and the intervals between adjacent markings may vary between 3 intervals of pitch in the case of a pair of adjacent long markings and 5 intervals of pitch in the case of a pair of short markings. Each APC 0 state may be perceived by eye as a diagonal pair of medium and short or short and short markings in tracks 3, 4. Each APC 1 state may be perceived by the presence of a medium and long or by a long and long pair of diagonal markings in the tracks 3, 4. The markings are read by a set of four photosensor sitting symmetrically over the tracks 3, 4 with the sensors being read clockwise or anti-clockwise and with the pair of sensors reading each track occurring at three intervals of pitch. With this arrangement the successive output states of the sensors as the tape 1 moves may be caused to obey FIG. 4, these properties arising by proper cooperation between the sensor array and the markings on the tape.

Figure 7:
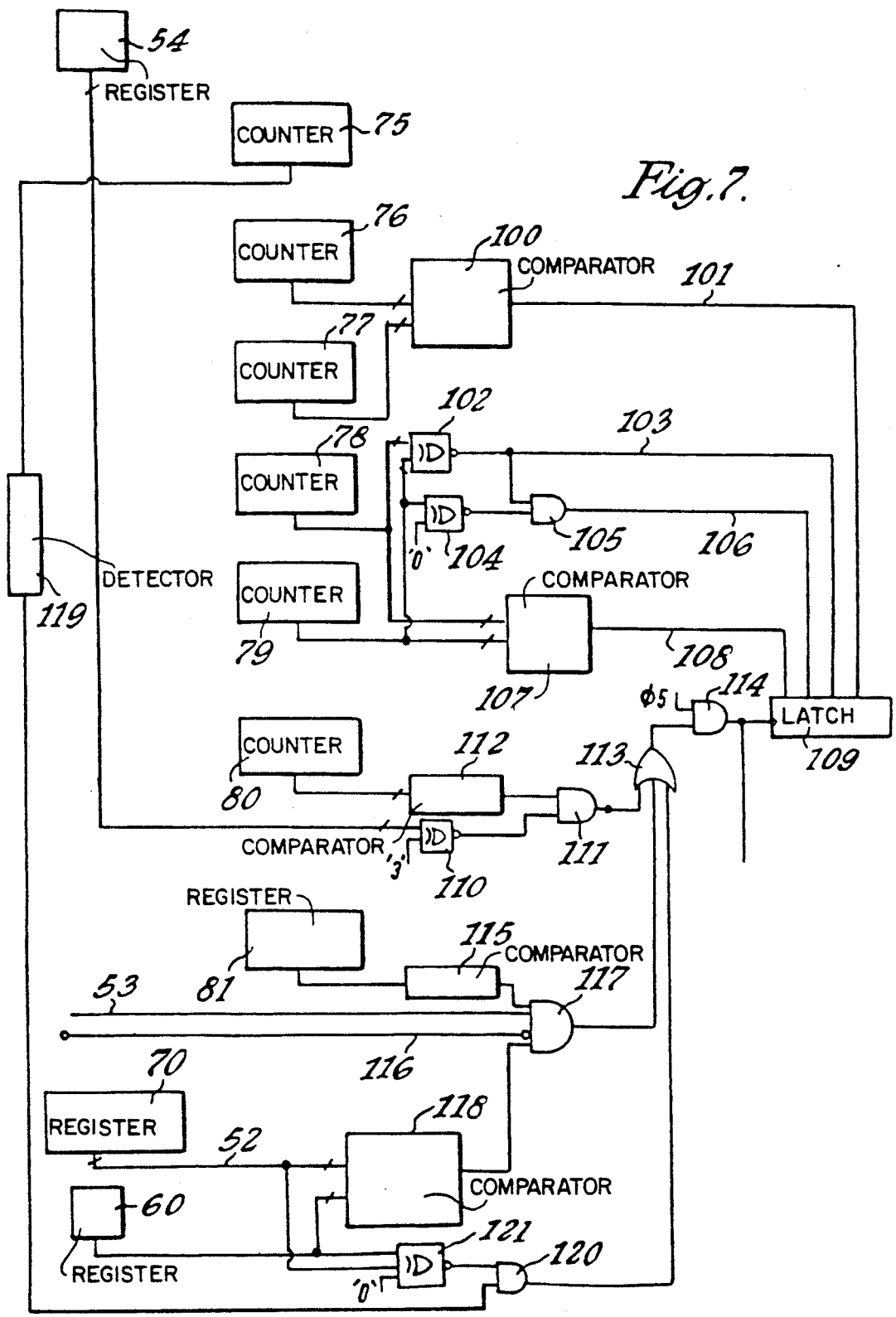
FIG. 7 is a block diagram of decision logic operating on the value of the attribute registers and counters of FIG. 6 to provide decoded APC bits to subsequent APC decoding logic.
Figure 8:
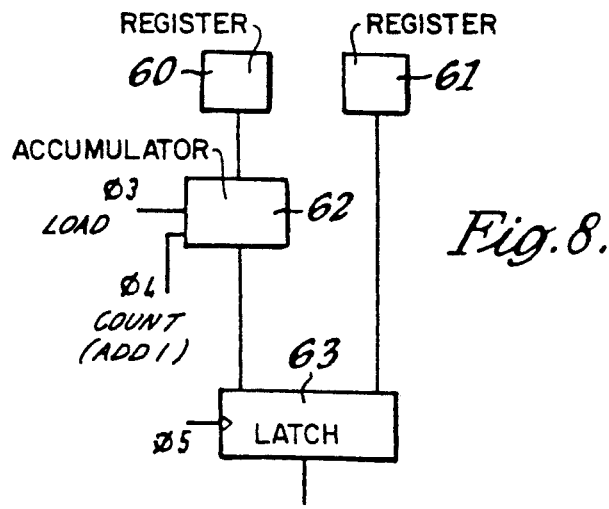
FIG. 8 shows state count logic providing a position output within a current local state sequence that is available to a microprocessor providing a control and output portion of the data processing system.

The outputs from termination and encoding logic in FIGS. 7 and 8 are as follows:

(1) a "state count" indicating the number of state transitions recorded within a current APC block;

(2) an "APC clock" pulse indicating that a complete sequence of local states has been traversed and a newly sensed APC bit has been decoded;

(3) a direction line 101, FIG. 7, indicating bit having a logic 1 value if the tape is moving forward and a logic 0 value if it is moving backwards;

(4) An APC bit line 108, FIG. 7 which can have the values 0, 1 or −1;

(5) an "APC HIf" line 103, FIG 7, which is set (logic 1) if there is an equal probability that the APC bit being looked at is a 1 or a 0; and (6) a minor error flag is set if there have been any erronious transitions in a local state cycle.

The "state count" (1) is passed direct to the microprocessor 12 to indicate tape position within the currently sensed APC block and the remaining outputs are passed to APC decisions logic when the end of a block has been reached. So the local state decoding logic has to determine when a block has terminated and the attributes of the APC bit decoded in that block.

Each local state transition seen within a local state block may be one of five types:

(1) invalid: i.e. any transition that does not occur in FIG. 4;
(2) APC bit 1, forward;
(3) APC bit 1, backward;
(4) APC bit 0, forward;
(5) APC bit 0, backward.

Figure 5:
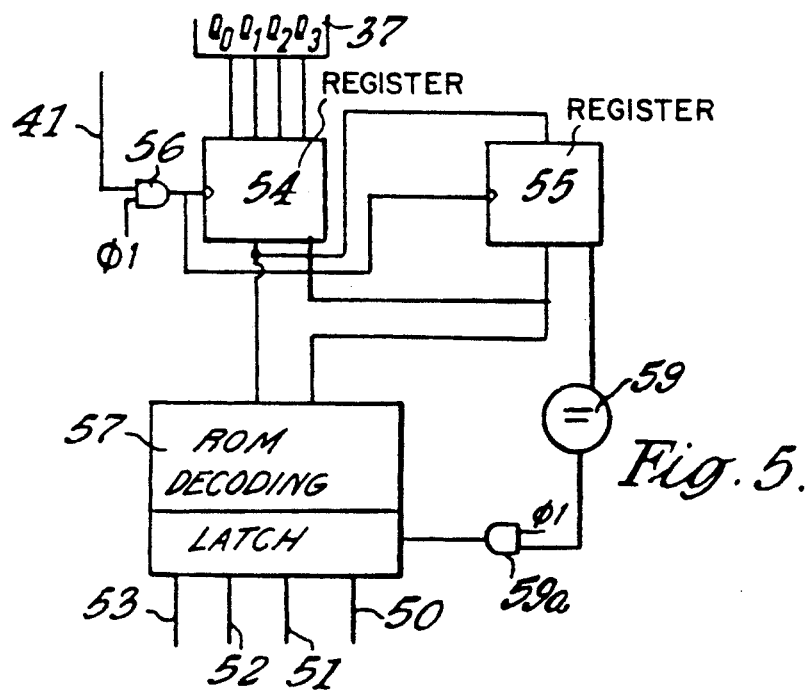
FIG. 5 is a block diagram of a local state input and decoder stage of a digital part of the data processing system.

Determination of the category into which a transition falls involves comparison of the current state of the output latch 37 with its previous states. In FIG. 5 a first clock phase $\phi 1$ and data ready line 41 are inputs to AND gate 56 whose output when high clocks current state register 54 so that when the data ready line 41 is active the outputs $Q_0$-$Q_3$ of the latch 37 are clocked by clock phase $\phi 1$ into the register 54. The previous state of register 54 is clocked by the output of AND gate 56 into a last state register 55. At the same time, the values in registers 54, 55 are clocked into decoding logic 57 that implements the local state transition diagram of FIG. 4 and derives therefrom a decoded APC bit 0 or 1 according to whether the states in registers 54, 55 lie on the left-or-right hand side of the diagram of FIG. 4, that APC bit appearing at line 50 as a logic 0 or 1 output. Output line 51 provides an output bit significant of current tape direction (forward or backward), output lines 52 provide a current position index within the APC block and output line 53 provides an invalidity flag. Although gate 56 is clocked at each phase $\phi 1$, the latch 58 does not change the output state at lines 50-53 unless comparator 59 indicates that the contents of registers 54, 55 are different, corresponding to tape movement between one local state and the next and enables the clock phase $\phi 1$ to pass via AND gate 59a input to the clock in part to latch 58.

Figure 6:
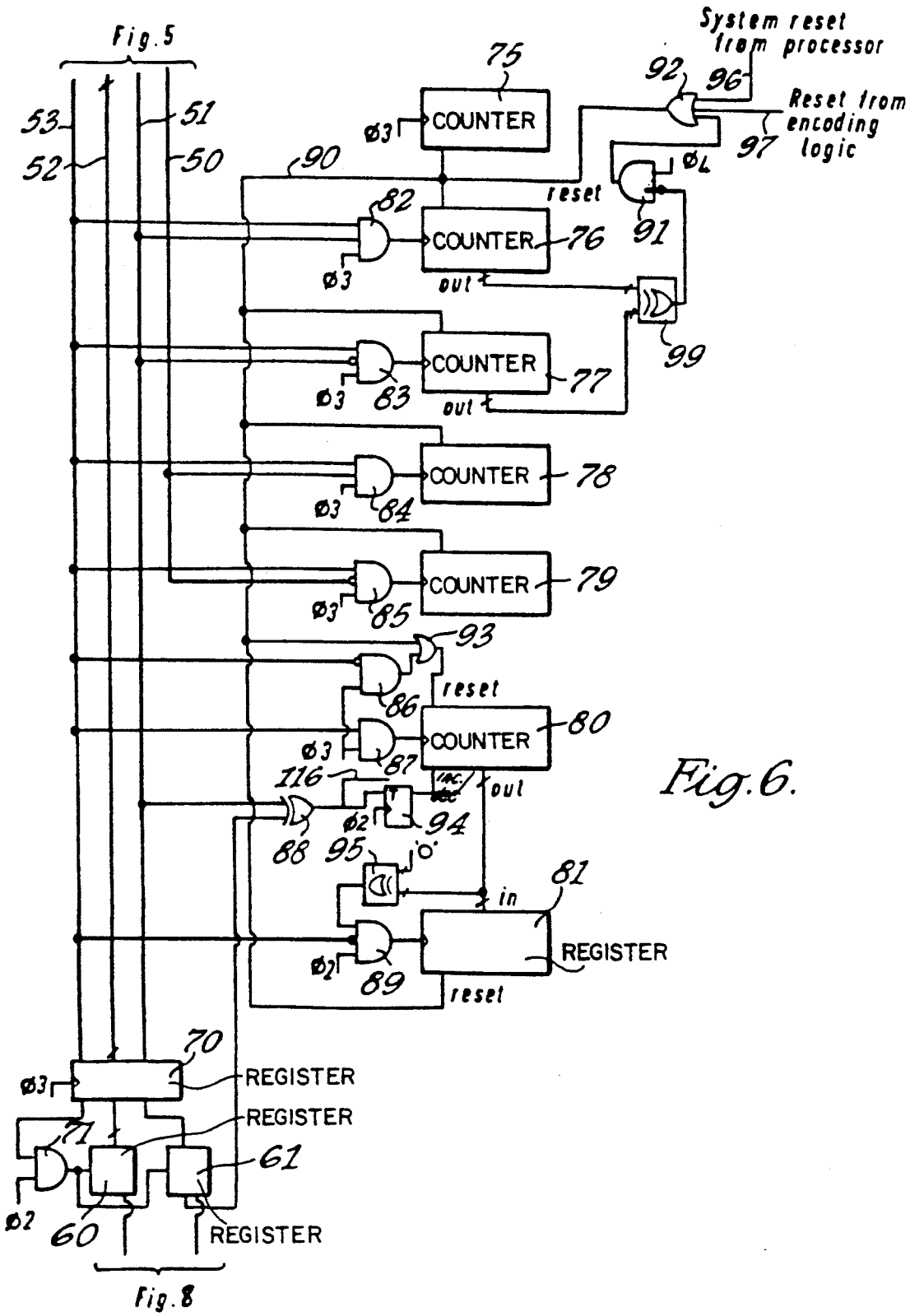
FIG. 6 is a block diagram of a local state attribute register and counter stage fed with output from the decoder stage of FIG 5.

Referring to FIG. 6, logic is shown that operates principally in clock phases $\phi 2$ and $\phi 3$. Lines 51-53 communicate with a current attribute register 70 that is clocked at phase $\phi 3$. But in the previous phase $\phi 2$ the existing contents of register 70 are clocked into previous local position register 60 and previous direction register 61 provided that a second input to AND gate 71 from attribute register 70 indicates that a valid transition had been flagged in line 53. Clock phase $\phi 2$ also enables AND gate 89 to store previous consecutive valid transitions in register 81 as will be more fully described below. On clock phase $\phi 3$, a number of counters 75-80 are incremented or decremented or either directly in the case of transition counter 75 or via gates 82-87 in the case of counters 76-80. Counter 76 is gated from lines 51 and 53 via gate 82 and records total valid forward transitions. Counter 77 is clocked through gate 83 from line 53 and line 51 with input inversion and records total valid backwards transitions. Counter 78 is gate via gate 84 from line 50, 53 and records total valid transitions within an expected APC 1 bit: similarly counter 79 is gated via gate 85 from line 53 and from line 50 with input inversion and records total valid transitions within an expected APC 0 bit. Counter 80 records consecutive valid transitions within a given APC bit for a given direction. If the previous direction continues on the next recognised APC bit exclusive OR gate 88 is enabled, clocked flip/flop 94 that provides an increment or decrement input to counter 80 remains at its previous (high) state and a valid transition at the input to gate 87 enables clock phase $\phi 3$ to pass to counter 80 thereby incrementing the number of valid counts. On direction change, exclusive OR gate 88 toggles flip/flop 94 and the contents of counter 80 are now decremented at each clock phase $\phi 3$. If an invalid count is flagged at line 53 or reset line 90 is activated, OR gate 93 resets the counter 80. A previous consecutive valid transistors register 81 is loaded from counter 80 on phase $\phi 2$ via AND gate 89 as mentioned above provided that the current bit in line 53 is invalid and the output of counter 80 is not 0, control being via EXCLUSIVE OR gate 95. In clock phase $\phi 4$ if the total forwards value in counter 76 equals the total backwards value in counter 77, exclusive OR gate 99 gives a low output to an inverting input of AND gate 91 which is fed via OD gate 92 to reset line 90, thereby resetting all the counters and registers 75-81 to their initial state. Resetting via OR gate 92 also takes place when system reset line 96 or encoding logic reset line 97 are active.

In FIG. 7 termination and encoding logic is applied to the contents of the counters 75-81 to determine when the end of a local state sequence has ocurred and to provide an output for subsequent processing. The values in counters 76, 77 provide inputs to comparator 100 whose output at line 101 indicates tape forward movement (logic 1) or backwards movement (logic 0). The total valid APC 1 count and total valid APC 0 count in registers 78, 79 are fed to comparator 102 which will give a logic 0 output except when the contents are equal, the output of gate 102 is at line 103. If the output in line 103 is logic 0 the probability is that more than half of a local state cycle (APC bit) will have been decoded correctly, and this is recognised in subsequent logic. If the contents in APC 0 register 79 are zero as detected by a comparator 104 and the contents of registers 78, 79 are equal as determined by comparator 102, an output from comparator 104 and the output in line 103 enable AND gate 105 to indicate a major error at line 106. An error flag in line 106 will be passed directed to the microprocessor 12 and will cause an error indication to be given on the display 12. The contents of register 78, 79 are fed to comparator 107 whose output in line 108 indicates whether the APC bit being sensed is logic 1 or Logic 0.

Data in lines 101, 103, 106, 108 is fed to output latch 109, and the remainder of the logic of FIG. 7 is used to regulate whether that output should be made available for subsequent processing. According to a first rule, if the current state is equal to the start state of a local state sequence and the consecutive valid transistors are greater than or equal to a threshold, then the output in latch 109 will be passed on. Accordingly, the current state in register 54 is fed to one input of comparator 110 whose other input is fed with a value equal to the start value of the local state sequence (in this instance 0011). The output of comparator 110 is fed to one input of AND gate 111 whose other output is fed with the contents of consecutive transistors counter 80 through threshold comparator 112. If both inputs to gate 111 are high, a logic 1 output is fed to OR gate 113 that in turn enables AND gate 114 to clock the latch 109 at the next clock phase $\phi 5$ thereby latching the state count outputs into latch or buffer 109. According to a second rule, the output latch 109 will be clocked on $\phi 5$ via OR gate 113 and And gate 114 if the following four conditions apply:

(a) the contents of previous consecutive valid transistors counter 81 exceed a threshold set by comparator 115;

(b) the valid line 53 is set;

(c) the current direction is the same as the previous valid direction as indicated at input line 116 from comparator 88; and (d) the current index in line 52 is less than a previous valid index held in register 60 as determined by comparator 118.

When the above four conditions are satisfied the output at gate 117 goes to logic 1. The object of this rule is to take account of sensing errors at the boundaries of state blocks resulting in failure to recognise that the last block has ended and a new block is being sensed.

According to a third rule, if the current index equals the previously valid index and equals zero (indicating no tape movement) and the number of transitions represents adjacency to the end of a cycle (7 transitions in this instance) then gates 113, 114 clock the output latch 109. Accordingly the following conditions must apply:

(a) the value in transition count register 75 fed through threshold (>7) detector 119 provides an enabling input to AND gate 120; and (b) the contents of previously valid index register 60 and current index in line 52 are both equal to 0 as determined by comparator 121 giving an enabling input to AND gate 120.

The effect of the third rule is to bring about a transition independent of an error at the end of a block.

FIG. (8) shows state count logic that identifies the position of the counters within the currently read APC state sequence based on a previously valid index in position register 60 and a previously valid direction in direction register 61. An accumulator 62 is clocked at clock phase $\phi 3$ to load the value of previously valid index from registers 60 and on clock phase $\phi 4$ the value in accumulator 62 is incremented by 1. On clock phase $\phi 5$ the new value in accumulator 62 is loaded into latch 63 as a state count output available to the microprocessor 12 together, with tape direction from register 61. Accordingly a current tape position within the local state sequence being read is available to the microprocessor 12 to give fine positioning of the tape 1.

It follows therefore that the local state decoding stage of the digital processing logic 9 supplies a local state count output for direct processing by the microprocessor 12 together with an APC bit, tape direction and error flag information to subsequent APC decoding logic forming part of the digital processing logic 9.

THE APC-DECODING LOGIC

Figure 9:
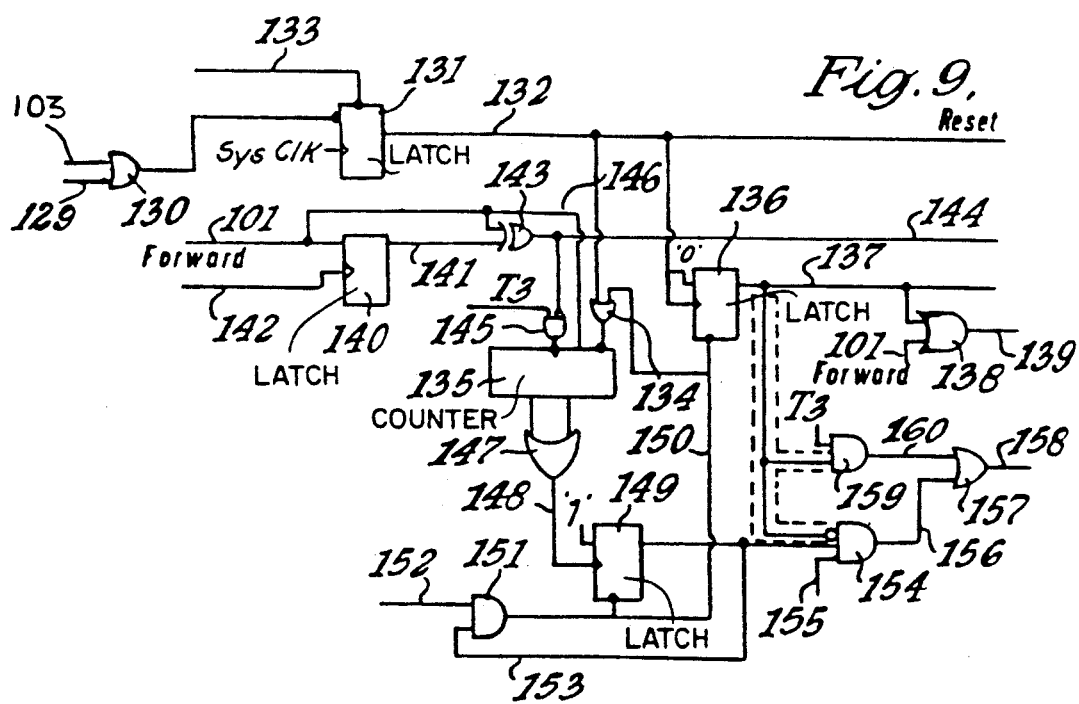
FIG. 9 shows APC decision logic that controls the handling of APC data bits fed from the local state decoding logic of FIGS. 5-8.
Figure 10:
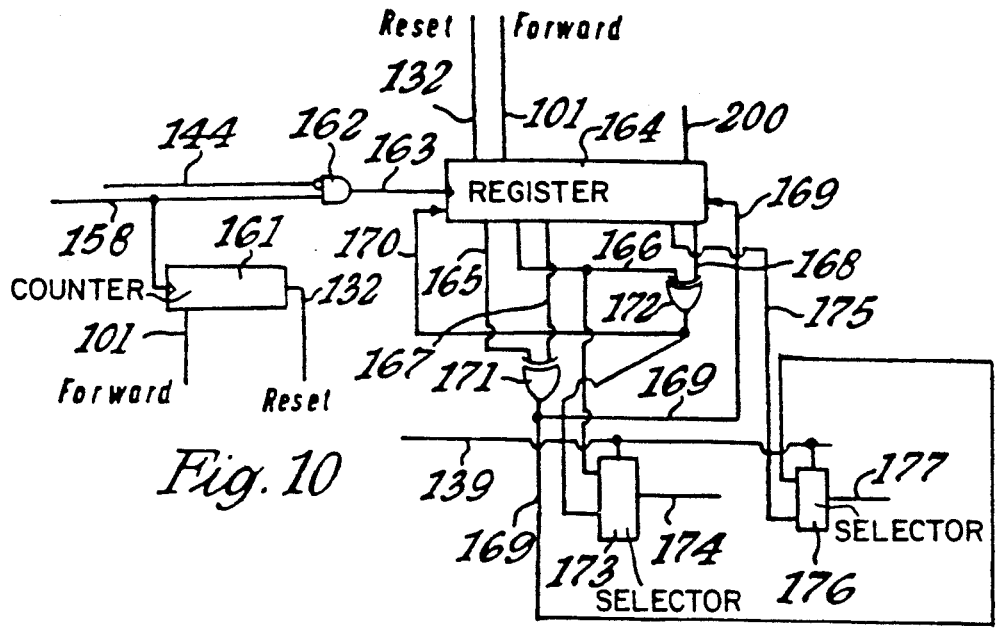
FIG. 10 shows a pseudo-random number generator forming an APC code generator stage of APC decoding logic.
Figure 11:
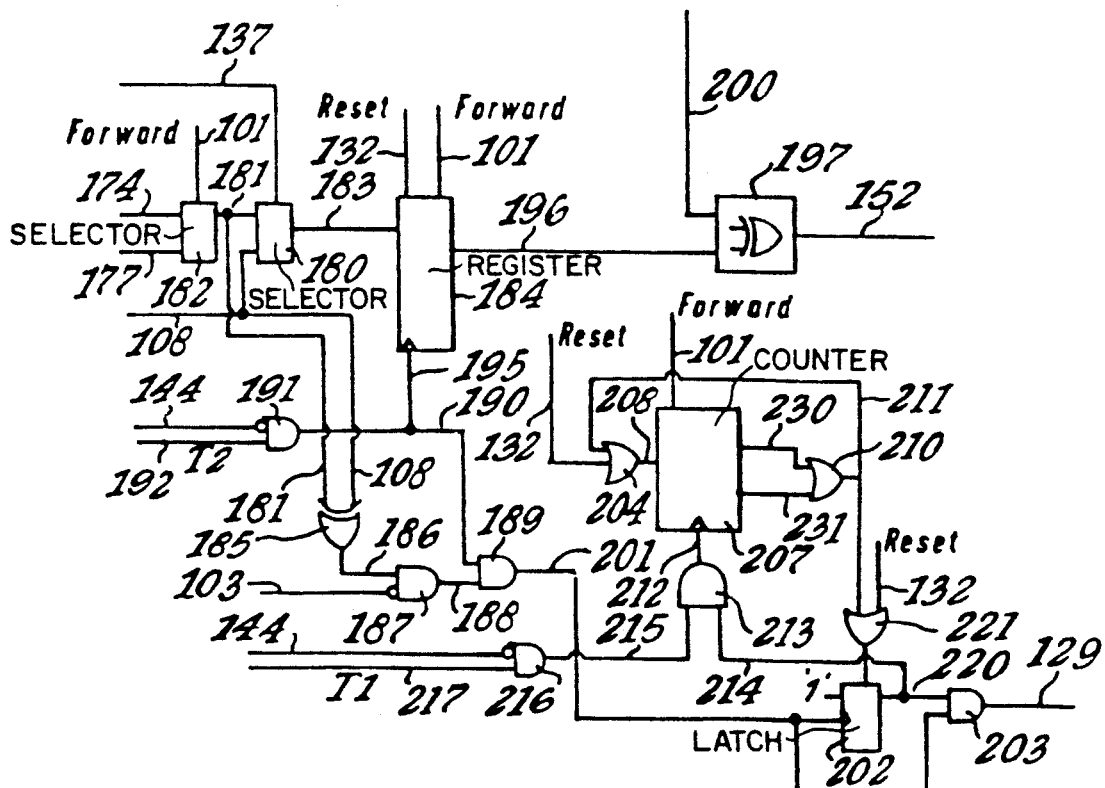
FIG. 11 shows a sensed APC bit shift register and comparator stage forming the remainder of the APC decoding logic.

The APC decoding logic of FIGS. 9-11 receives APC bit information from the local encoding logic of FIGS. 5-8, and assembles successive APC bits into a n-bit APC word which in the present instance is eleven bits long and is stored in a shift register n-bits long clocked on detection of each APC bit. It contains an APC code generator that when clocked from an initial state reproduces the sequence of APC bits laid down on the tape, a comparator for determining a match of the state of the APC code generator with that of the sensed APC word shift register, and a counter for indicating how many register clock pulses are required to achieve a match, the value in the counter being significant of position in the APC sequence and hence of tape position.

Means are provided for initialisation and rapid clocking of the code generator until a match is obtained, followed by clocking on successive incoming APC bits so that the bit pattern in the APC word shift register is tracked by the state of the APC code generator. Error checking is provided by a "look ahead" facility in which an incoming APC bit is compared with an expected APC bit from the APC code generator and an error is flagged if a match is not obtained.

The circuit of FIG. 9 controls the processing of APC data fed via latch 109 and toggles between a normal mode in which a clock pulse is generated on a pseudo-random bit generator (PRBG) clock line on every APC bit, and a reset mode in which sequential APC bits are counted to enable tape position to be recalculated. In an error condition, OR gate 130 receives an input from APC half-bit output line 103 through latch 109 or an invalid APC bit from line 129 (FIG. 11) indicating either that the local state logic has been unable to decode a local state sequence or that the APC bit from the local state logic is not the expected next bit in the APC sequence.

In either of these events, output of OR gate 130 goes high and is clocked on the next system clock through latch 131 to a reset line 132. The line 132 also goes high if a reset signal is received from the microprocessor 12 via line 133 and output port 13. The state of reset line 132 is fed through OR gate 134 to reset an n-bit counter 135. The error signalled at line 132 clocks latch 136 to cause a bad APC line 137 to go low and the state on line 137 is also fed to one input of a direction match OR gate 138 whose other input from line 101 is at logic 1 when the tape is going forward, the direction output from gate 138 being at line 139.

The value on line 101 is also fed into latch 140 the contents of which are put out at line 141 when an APC clock signal of phase $\phi 3$ occurs in line 142. The forward direction at line 101 and last forward direction at line 141 are compared at EXCLUSIVE OR gate 143 and if different cause direction change line 144 to be set. The direction change signal at line 144 is also inverted and fed to AND gate 145 whose other input is the APC clock phase $\phi 3$ and whose output goes to the clock input counter 135. The direction of count is governed by the value in lines 101, 146 so that when the signal at line 146 is high, the counter 135 counts in a positive sense and when the signal is low, counts in a negative sense. The shift register counter 135 has outputs >11 or <−11 (depending upon the state of line 146), which form inputs to OR gate 147 which clocks latch 149 via line 148. The input to latch 149 is a constant logic 1. The input to latch 136 is a constant logic 0. Latches 136, 149 are enabled via line 150 which is an output of AND gate 151. The inputs to AND gate 151 are a comparator input 152 (FIG. 11) and a "get match" output 153 from latch 149. Assuming that the value in the PRBG shift register 164 is not the same as the value in the APC shift register 184, then comparator line 152 will be high, the "get match" line 153 will also be set high and line 150 will further be high, enabling latches 149, 136. The outputs of latches 149, 136 are fed as inverting and normal inputs to gate 154 fed with system clock pulses at 155 which appear at output line 156 as an input to OR gate 157. Accordingly in an error condition the system clock equals the pseudo-random-bit generator (PRBG) clock 158. In a non-error state line 137 is set to logic 1 which enables the APC clock phase T3 at line 142 to be passed through AND gate 159, output line 160, and OR gate 157 so that the APC clock at line 142 provides the PRBG clock 158. Accordingly the decision logic toggles the output at line 158 between an error state in which fast system clock pulses from line 155 appear and a normal mode in which a clock pulse appears when an APC bit has been decoded as indicated by a pulse in line 142.

FIG. 10 shows a pseudo-random bit or number generator for generating within the digital processing circuitry a sequence of pseudo-random numbers corresponding to the APC bit sequence on the tape. It may be controlled according to the direction of movement of the tape to generate the APC bit which is above or below the current APC position and generates an APC count corresponding to the position of the APC sequence in the pseudo-random number sequence. PRBG clock pulses at line 158 are connected to APC up/down counter 161 which counts in a sense toggled by direction line 101. The clock line 158 and direction change line 144 are input into gate 162 whose output in line 163 provides a clock into an n-bit shift register 164 whose direction of clocking is set by direction line 101 and that can be reset via line 132 (FIG. 9). The shift register has inputs 169, 170 and taps are taken at intermediate positions 165–168. Taps 165, 167 form an input to EXCLUSIVE OR gate 171 whose output provides input 169 to shift register 164. Taps 166, 168 form an input to EXCLUSIVE OR gate 172 whose output provides input 170 to the shift register 164. This combination of taps and gates is selected to generate an appropriate pseudo-random sequence. Taps 166, 170 form an input to selector 173 whose output 174 depends on the state of the match direction value in line 139. Thus in normal operation line 139 changes state between forwards and reverse tape travel, but under error conditions the line 139 is held to logic 0 so that the selectors 173, 176 are set to look at tabs of the shift register 164 corresponding to forward movement. Similarly taps 169, 175 from the shift register form an input to selector 176 whose output 177 depends upon the match direction value in line 139. The bits in output lines 174, 177 from selectors 173, 176 are the expected next forward and reverse bits in the APC sequence. Thus the register 164 acts as a decoder for the APC code on the tape 1 (that will have been generated by similar clocked shift register acting as an encoder) and provides a "look ahead" facility.

FIG. 11 shows how detected APC bits are gathered for comparison. The expected APC bits at 174, 177 are fed to selector 182 controlled by the signal in line 101 and one of them is passed as an output in line 181. The forward bit (bit f) in line 174 is output if line 101 is high, otherwise the backwards bit (bit b) in line 177 is output. The expected APC bit in line 181 forms one input to selector 180 whose other input bit is the decoded APC bit at line 108. Selector 180 is controlled by bad APC signal line 137 to pass the expected bit 181 to line 183 under normal conditions, thereby allowing a decoded APC shift register 184 to ignore errors in decoding single APC bits, or the decoded bit in line 108 during the reset condition when accumulating a new APC code. The detected or substituted APC code bits at 183 are fed successively into and through the n-bit shift register 184 which accumulates an APC word consisting of the last n decoded or substituted APC bits (in this instance n=11). EXCLUSIVE OR gate 185 compares the expected APC bit at 181 with the decoded bit at 108. If they are both the same, output 186 of gate 185 stays low but if they are different then output 186 of gate 185 goes high. In the absence of an APC hlf signal the signal in line 103 which forms an inverting input to AND gate 187 is low. The input to gate 187 from line 186 will remain low while there is a match between the expected and decoded APC bits and the output 188 of the gate 187 will remain low: otherwise lines 186 and 188 go high indicating a mismatch in the expected and encoded APC bits. If the APC half line 103 is high indicating uncertainty in the APC bit from the local state decoding the line 188 will remain low irrespective of the state of line 186. A mismatch in decoded and expected APC bits detected at gate 185 will set a latch 202 (described below) to indicate a 1-bit error and will start clocking of an error counter 207.

An inverted direction change signal at direction change line 144 and APC CLK signals of phase T2 in line 192 form inputs to AND gate 191 so that APC clock pulses are passed to line 190 when line 144 is set low. When direction change input line 144 is low the APC CLK signals of phase T2 appear on clock input 195 of shift register 184. The signals on line 188, 190 are combined at AND gate 189 whose output line 201 will also carry an APC CLK signal of phase T2 provided that (i) the APC hlf line 103 remains low, (ii) the direction change line 144 remains low and (iii) the lines 186 and 188 have gone high, indicating that the expected and decoded APC bits differ.

APC CLK pulses of phase T2 in output line 201 of AND gate 189 appear as a clock input to latch 202 and an input to AND gate 203. The effect of the APC CLK pulses in line 201 is (a) to set the output 220 of latch 202 that has a logic 1 input high when line 201 goes high, and (b) where AND gate 203 is enabled through line 220 to pass to the invalid APC line 129.

When a first erroneous APC bit is detected, an error counter 207 is cleared and set to count through a set of the next n APC bits so that track is kept of the substituted APC bit in relation to the sequence being built up in the shift register 184. When there has been no tape direction change and the direction change line 144 that provides an inverting input to AND gate 216 is low, the gate 216 passes APC CLK pulses of phase T1 carried by line 217, and the clock pulses are carried by output line 215 to AND gate 213. Output 212 of AND gate 213 carries a clock when input 215 to gate 213 carries the APC CLK pulses of phase T1.

Input 214 of AND gate 213 will have been latched high by latch 202 signifying an APC bit in error. If a decoded APC bit is or was in error and the consequent substituted APC bit is one of the n APC bits present in shift register 184, the error counter 207 will be clocked by APC CLK pulses of phase T1 as every decoded APC bit is generated. If the tape direction input at line 101 to counter 207 is low then the count in counter 207 is decremented for every clock pulse, but if line 101 is high, then the count at counter 207 is incremented. If the count in counter 207 reaches n or −n, then output 230 or output 231 are set high, these lines providing inputs to OR gate 210. When either of lines 230 or 231 goes high, the output line 211 of OR gate 210 is also set high, that line providing a logic 1 input to OR gate 204 so that the output line 208 goes high and resets the error counter 207 to zero through OR gate 204 that also passes a reset signal on line 132. Therefore if a decoded APC bit did not match the expected value in either forward or reverse tape travel, the expected APC bit has been fed into shift register 184 in substitution for the erroneously decoded bit, and by subsequent tape movement the substituted bit has been clocked out of the shift register 184 by n consecutive clock pulses then the error counter 207 is reset to zero. The high value of line 211 is also input to OR gate 221 whose output line goes high and resets latch 202. (The other input to OR gate 221 is via reset line 132). The consequent low output in line 220 from latch 202 is input via line 214 to AND gate 213 which now will not transmit APC CLK pulses of phase T1 to counter 207. And gate 203 is also disabled because its input at line 220 is low, and APC CLK pulses of phase T2 can no longer pass to line 129. Consequently an erroneous decoded APC bit can be substituted with an expected APC bit and the n-bit APC code in shift register 184 will be preserved provided that the next n decoded APC bits match their expected values. No output will appear at the invalid APC line 129 on a first invalid APC bit because output 220 of latch 202 will be low during the relevant APC clock pulse of phase T2. But the circuit of FIG. 11 responds to a second erroneous APC bit within a word of n APC bits by outputting an invalid APC flag at line 129 which forces the system to reset. If a previous error has been detected and the substituted APC bit is still in shift register 184, the output line 220 of latch 202 is set high and enables AND gate 203. If a second error occurs, input line 201 to AND gate 203 goes high again, setting the invalid APC output line 129 high and forcing the system into reset. In this way the circuit of FIG. 11 can recover from a single APC bit error in an n-bit sequence but will reset if a second error has occurred in the same sequence, causing a reset in the decision logic of FIG. 9.

Assuming no direction change at 144, incoming APC CLK pulses of phase T2 at line 192 pass via AND gate 191 and line 190 to the clock input 195 of the shift register 184 whose n-APC sensed bit output at lines 196 forms one input to comparator 197 whose other input 200 is the current value of the generated APC code in shift register 164. The output line 152 from comparator 157 is low when the generated APC code in decoder or PRBG shift register 164 matches the sequence of sensed and decoded APC bits in register 184 and provides an input to gate 151 that toggles the clock pulses at line 158 between system clocking from line 155 and APC clocking from line 142. Thereby the APC decoding shift register 164 is clocked rapidly by system clock pulses until a match is obtained and thereafter, provided that the match at comparator 197 is maintained changes state only with incoming APC bits.

Assuming that valid transitions have been sensed at both the local state and APC levels, the state count output in latch 63 and the value in APC counter 161 are available through input port 11 to the microprocessor 12 where they are combined by a position analysis program to derive the position of the tape 1 relative to the casing 6, which position is output through display RAM 18 to the liquid crystal display 23.

We claim:

1. Displacement measuring apparatus comprising reading means and a member moveable relative to the reading means, said member carrying a position track defined by a sequence of alternative markings made in succession along the member, the alternative markings recording different values in a pseudo-random sequence which is the result of repetitive operations on a seed consisting of a small number of elements and is at least a portion of a linear binary sequence obtained by clocking a feedback shift register, the sequence having the property that a group of successive markings of length at least equal to that of the seed occurs at a single position in the sequence so that a succession of markings read from the track and of length at least equal to the seed defines an absolute position of the reading means and the member;

said reading means having at least three sensors arranged to respond to different locations within each marking with the pattern of the markings and the location of the sensors arranged so that only a single sensor changes state each time that the member moves through an interval of displacement relatively to the sensing means, the states occurring consecutively in alternative sequences along the member that are recognizable by decoding logic fed with successive states as a logical value corresponding to one of the alternative markings depending upon which sequence has been followed, said decoding logic comprising:

first shift register means having a length at least equal to the seed through which logical values are clocked, said values corresponding to successive markings recognized by the reading means, second shift register means for reproducing the pseudo-random sequence when the register means are clocked; and comparator means for detecting a relationship in the states of the first and second shift register means.

2. An image reading device according to claim 1, further comprising a stopper means for stopping said retaining member from rotating to a position where said member would become detachable, said detachable position being one in which the planes of said rotary fulcrum shaft are parallel to a center line of said guide portions of said mounting recesses.

3. An image reading device comprising:
a device body;
a document transport means which is provided within said device body and which transports original documents along a predetermined document transport path;
an image sensor unit which is located under said document transport path so as to read each of the documents passing through said path;
a retaining member rotatably mounting said image sensor unit to said device body for rotation relative to said device body, said retaining member comprising a rotary fulcrum shaft located adjacent to a bottom of said device body; and
a cover member for swingingly covering a portion of said bottom of said device body near the position where said retaining member is located, said cover member including a means for restricting the rotational angle through which said image sensor unit can rotate when said cover member is fixedly mounted in place covering said portion of said bottom of said device body.

4. Apparatus according to claim 1 wherein the decoding logic supplies a local state count significantly of the position of the member within a currently sensed marking which can be used to indicate a fine position of the member between recognized markings.

5. Apparatus according to claim 1 wherein the decoding logic includes means responsive to the output state of the comparator means for rapidly clocking the second shift register means until the relationship is detected and, while the relationship exists, clocking the first and second shift registers to recognize logical values corresponding to the markings; and counter means for counting the clock pulses fed to the second shift register means.

6. Apparatus according to claim 1 wherein the decoding logic includes direction control logic for recognizing a direction of relative movement of the reading means and member from successive states of said sensors and, depending upon said recognized direction of movement, for altering the direction in which said counter means counts.

7. Apparatus according to claim 1, wherein the states of each sequence define a binary code in which each state differs from its neighbors so that a transition between a pair of adjacent states defines the logical value of a marking, as well as the positions in the state sequence between which the transition has occurred and the direction in which the number has moved, the decoding logic includes a current local state register means and last local state register means into which sensed states are fed in pairs, the values in said current and said last local state register means being fed to decoder means that serves to decode said local states and provide outputs defining whether the successive local states define a valid local state transition, an index within the state sequence, the direction of travel of the member and the marking corresponding to that transition.

8. Apparatus according to claim 7, wherein the decoding logic (a) counts forward and backward transitions in a sequence being read and provides a difference output significant of the direction of the member and the distance moved;

(b) count transitions having logic 1 and logic 0 values of the marking and outputs a decoded absolute marking value depending on the difference in said counts; and (c) flags when an error has occurred in a sensed local state sequence.

9. Apparatus according to claim 8, wherein the decoding logic flags when there is a half probability that the local state sequence has been decoded correctly, the logical value corresponding to the expected marking being admitted to the first shift register means without an error being flagged.

* * * * *

UNITED STATES PATENT AND TRADEMARK OFFICE
CERTIFICATE OF CORRECTION

PATENT NO. : 5,208,767
DATED : May 4, 1993
INVENTOR(S) : George-Kelso et al

It is certified that error appears in the above-indentified patent and that said Letters Patent is hereby corrected as shown below:

Column 14:
Delete claim 2.

Delete claim 3.

Insert the following claim:

2. Apparatus according to claim 1 including second comparator means wherein the second shift register supplies a logical value corresponding to the expected next marking while said relationship exists, said apparatus including second comparator means for detecting whether the incoming logical value representing a marking read from the tape coincides with the expected value, and said decoding logic includes error handling logic for:
   (a) upon existence of the relationship, admitting the logical value to the first shift register means and enabling the first and second shift register means to be clocked;
   (b) upon a first indication of non-existence of the relationship, admitting a logical value corresponding to the expected marking to the first shift register means, enabling the first and second shift register means to be clocked and enabling error activated counter means to count incoming logical values up to a threshold; and
   (c) upon a second indication of non-existence of the relationship within the threshold, resetting the first and second shift register means.

UNITED STATES PATENT AND TRADEMARK OFFICE
CERTIFICATE OF CORRECTION

PATENT NO. : 5,208,767
DATED : May 4, 1993
INVENTOR(S) : George-Kelso et al

It is certified that error appears in the above-indentified patent and that said Letters Patent is hereby corrected as shown below:

Insert the following claim:

3. Apparatus according to claim 1 wherein said member carries twin encoder tracks, said apparatus including illuminations means for illuminating the encoder tracks, a set of photosensors providing a local pattern of at least three output signals, analogue processing means for feeding the output signals of the photosensors in separate channels, peak detector means for passing to the comparator means said output signal with the highest signal level as a logic 1 via an attenuator means and the output signals of a lesser level as logic 0, current source means for adjusting the brightness of the illumination means, timing and control logic for pulsing the current source means to provide light from the illumination means in pulses, and output latch means for receiving logical values corresponding to the photosensor states and a data ready output from the timing and control logic.

Signed and Sealed this

Twelfth Day of July, 1994

Attest:

BRUCE LEHMAN

*Attesting Officer*    *Commissioner of Patents and Trademarks*